United States Patent [19]
Harrington et al.

[11] Patent Number: 4,854,437
[45] Date of Patent: Aug. 8, 1989

[54] RADIALLY ADJUSTABLE CLUTCH RELEASE BEARING ASSEMBLY

[75] Inventors: Richard F. Harrington, Lincolnwood; James Selgrad, Des Plaines, both of Ill.

[73] Assignee: Aetna Bearing Company, Chicago, Ill.

[21] Appl. No.: 119,164

[22] Filed: Nov. 10, 1987

Related U.S. Application Data

[62] Division of Ser. No. 878,568, Jun. 25, 1986, Pat. No. 4,724,943.

[51] Int. Cl.[4] ............................................. F16D 23/14
[52] U.S. Cl. ................................. 192/98; 192/110 B; 384/495; 384/536; 384/612
[58] Field of Search .............. 192/98, 110 B; 384/495, 384/536, 558, 582, 612, 620

[56] References Cited

U.S. PATENT DOCUMENTS

| | | | |
|---|---|---|---|
| 3,286,802 | 11/1966 | Fädler et al. | 192/98 |
| 3,604,545 | 9/1971 | Bourgeois | 192/98 |
| 3,788,437 | 1/1974 | Camp | 192/98 |
| 3,805,934 | 4/1974 | Labadie | 192/98 |
| 3,909,086 | 9/1975 | Keleshian | 384/617 |
| 3,921,775 | 11/1975 | Matyschik | 192/98 |
| 4,026,398 | 5/1977 | Matyschik et al. | 192/98 |
| 4,046,436 | 9/1977 | Brown | 384/617 |
| 4,109,977 | 8/1978 | Staphen | 384/454 |
| 4,478,325 | 10/1984 | Dagiel | 192/98 |
| 4,506,774 | 3/1985 | Block | 192/98 |
| 4,555,007 | 11/1985 | Harrington et al. | 192/98 |
| 4,579,465 | 4/1986 | Horner | 384/612 |
| 4,668,110 | 5/1987 | Égatö et al. | 384/536 |
| 4,739,867 | 4/1988 | Harrington | 192/98 |

FOREIGN PATENT DOCUMENTS

| | | | |
|---|---|---|---|
| 3410116 | 10/1985 | Fed. Rep. of Germany | 192/98 |
| 2045380 | 10/1980 | United Kingdom | 192/98 |
| 2054084 | 2/1981 | United Kingdom | 192/98 |
| 2070182 | 9/1981 | United Kingdom | 192/98 |
| 2086518 | 5/1982 | United Kingdom | 192/98 |
| 2096263 | 10/1982 | United Kingdom | 192/98 |

*Primary Examiner*—Leslie A. Braun
*Assistant Examiner*—Richard M. Lorence
*Attorney, Agent, or Firm*—R. A. Giangiorgi

[57] ABSTRACT

A self-aligning clutch release bearing and carrier sleeve assembly includes a carrier sleeve which defines a first axis and a bearing adapted to be brought into engagement with rotating clutch fingers or the like of a clutch mechanism, which clutch fingers rotate about a second axis which may not be exactly coincidental with the first axis. The bearing and carrier sleeve assembly is adapted to adjust the rotation orientation of the bearing to coincide with the second axis of rotation of the clutch fingers. This bearing and carrier sleeve assembly comprises: a bearing including a generally annular thrust face for engagement with the clutch fingers and first and second annular raceways having a plurality of bearing elements disposed therebetween, one of the raceways rotating in unison with the thrust face and the other of the raceways being coupled with the carrier sleeve. A mounting arrangement is provided for grippingly engaging the second raceway for mounting the same to the carrier sleeve. The second raceway having an annular radially inwardly extending shoulder portion and the mounting arrangement defines a recess of complementary form for receiving the raceway shoulder portion therewithin. The raceway shoulder portion terminates at a position radially spaced apart from a radially innermost end of the recess for permitting a predetermined amount of radial movement of the bearing relative to the carrier sleeve while substantially preventing axial movement of the bearing relative to the carrier sleeve.

6 Claims, 3 Drawing Sheets

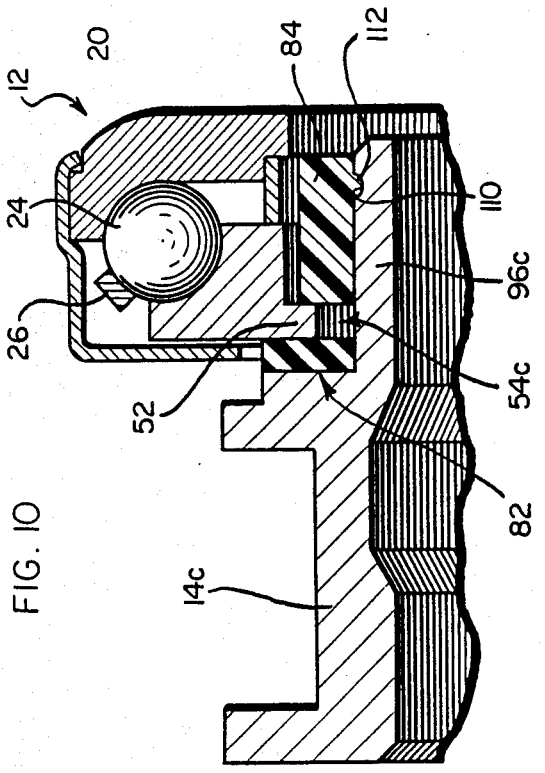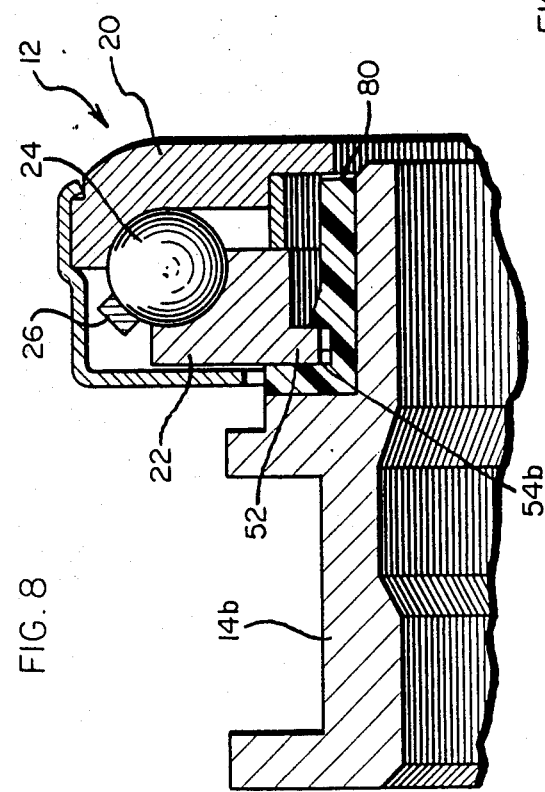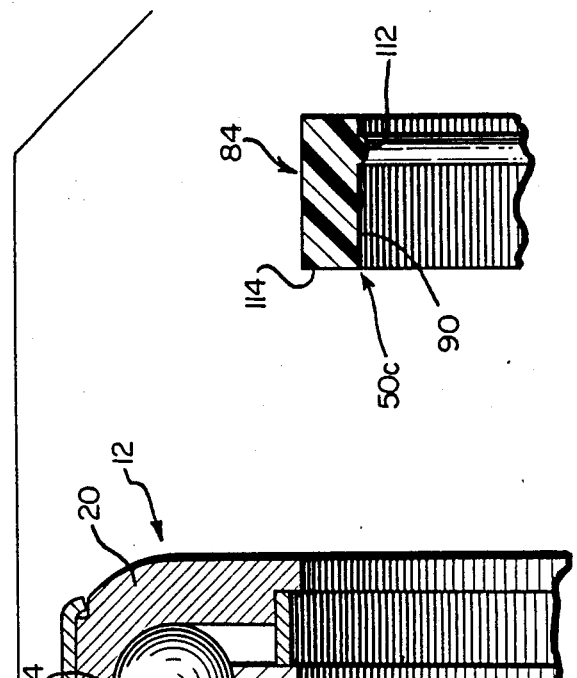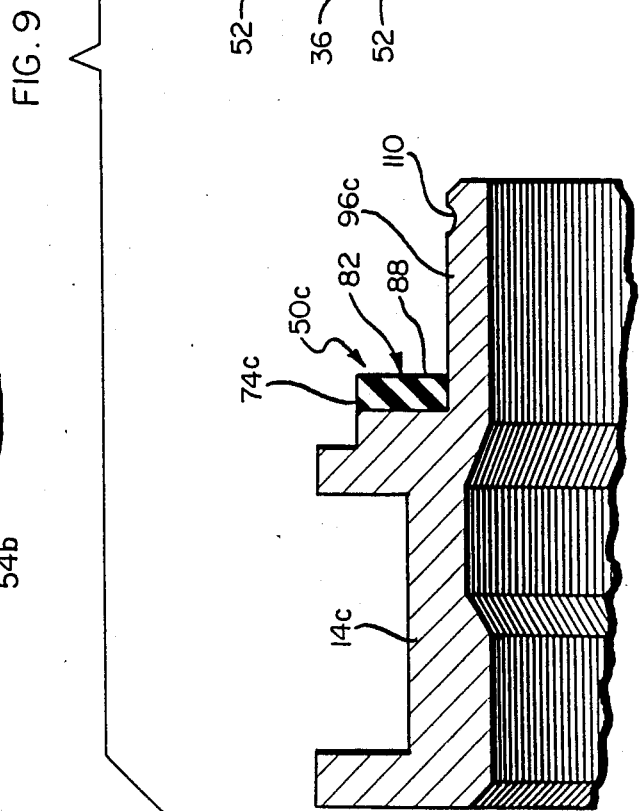

RADIALLY ADJUSTABLE CLUTCH RELEASE BEARING ASSEMBLY

This is a division of co-pending application Ser. No. 878,568 filed on June 25, 1986, now U.S. Pat. No. 4,724,943 issued Feb. 16, 1988.

BACKGROUND OF THE INVENTION

This invention relates generally to clutch release type thrust bearings, and more particularly concerns a clutch release bearing which is adapted to permit radial realignment or adjustment of the bearing relative to a carrier sleeve on which it is mounted so as to accommodate some slight misalignment between the axis of a carrier sleeve upon which the bearing is mounting on the one hand and the axis of rotation of clutch release fingers against which the bearing engages on the other hand.

Automotive clutch throw-out or release bearings are used as a force-transmitting device between a foot-operated clutch pedal lever and clutch fingers. Generally speaking, the bearing comprises a thrust type of bearing adapted to transmit thrust forces from a nonrotating pedal lever mechanism to the rotating fingers of the clutch mechanism. The mass production of automotive clutches, clutch bearings and associated parts requires that these parts be manufactured and assembled at minimum cost. However, relatively high standards of quality and reliability must also be met in this process. To assure compatability of the mass produced parts, it is important that the parts be designed, arranged and/or assembled so as to reliably operate in spite of slight part misalignments which may occur during assembly. These misalignments can arise as a result of minor variations in part sizes and shapes, even though each part may be within manufacturing tolerances.

Such misalignments can also occur gradually over the service life of the vehicle, due to the substantial operating forces and occasional wear over long periods of use to which the parts are subjected. Exemplary clutch throw-out bearing assemblies are described for example in U.S. Pat. No. 3,909,086 and U.S. Pat. No. 4,046,436.

The bearing of the present invention is advantageously designed so as to permit some radial movement or displacement of the bearing relative to a radially stationary carrier sleeve member to which it is mounted. This radial movement accommodates a corresponding amount of radial misalignment which may occur between the axis of the carrier sleeve and the axis of rotation of the clutch fingers which the thrust face of the bearing is intended to engage. This assures proper engagement of the clutch fingers by the bearing thrust face.

Moreover, the bearing assembly of the present invention is advantageously designed so as to permit such radial movement or realignment of the bearing relative to the carrier sleeve only in response to radial forces applied thereto upon engagement with the clutch fingers. Once the proper axial alignment is achieved, the assembly of the invention provides for frictional engagement of the bearing which engagement tends to maintain the radial position or orientation of the bearing relative to the carrier sleeve in the absence of further force applied thereto in a radial direction. That is, the radial movement permitted the bearing does not result in a radially free bearing which might oscillate or wobble, but only permits movement as required for alignment with the clutch fingers, thereafter tending to maintain the bearing in the radial orientation appropriate for maintaining such alignment.

Further in this regard, the bearing of the invention may also be utilized with a constant running type of clutch arrangement which maintains a slight preloading of the clutch bearing relative to the clutch fingers. That is, the bearing thrust face is maintained in engagement with the clutch fingers for rotation therewith whenever the associated automotive engine is running.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 4 is a greatly enlarged partial sectional view of a portion of the assembly of FIG. 4;

FIG. 8 is a partial sectional view of the assembly of FIG. 7 in its assembled form;

FIG. 9 is a partially exploded, partial sectional view similar to FIG. 7, illustrating yet a further embodiment of the invention; and FIG. 10 is a partial sectional view illustrating the embodiment of FIG. 9 in an assembled condition.

DETAILED DESCRIPTION OF THE ILLUSTRATED EMBODIMENT

Figure 1:
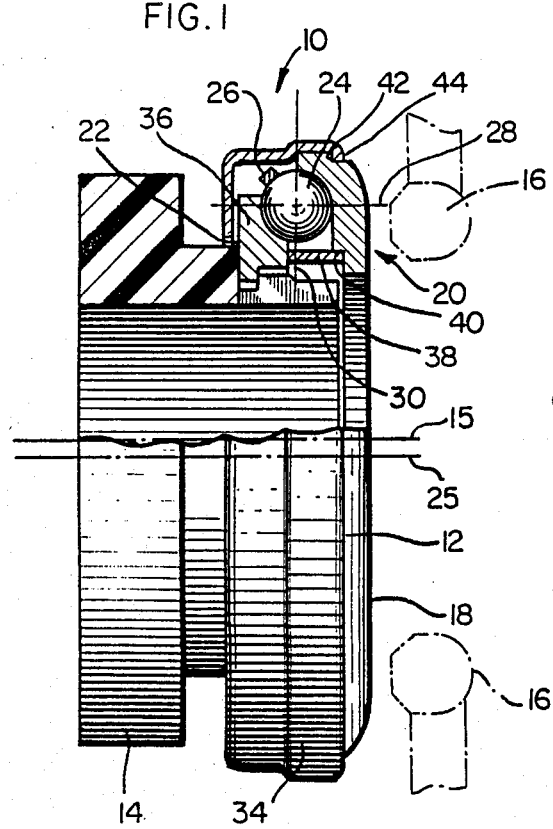
FIG. 1 is a side elevation, partially broken away and partially in section, illustrating a clutch release bearing and carrier sleeve assembly in accordance with a first embodiment of the present invention.
Figure 2:
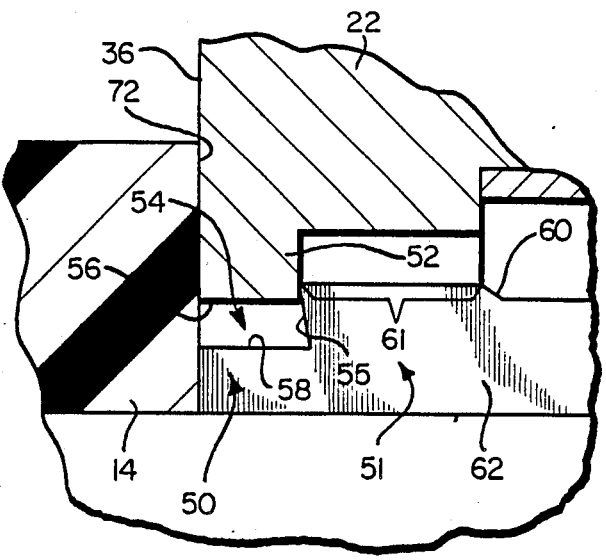
FIG. 2 is a greatly enlarged partial sectional view of a portion of the assembly of FIG. 1.
Figure 3:
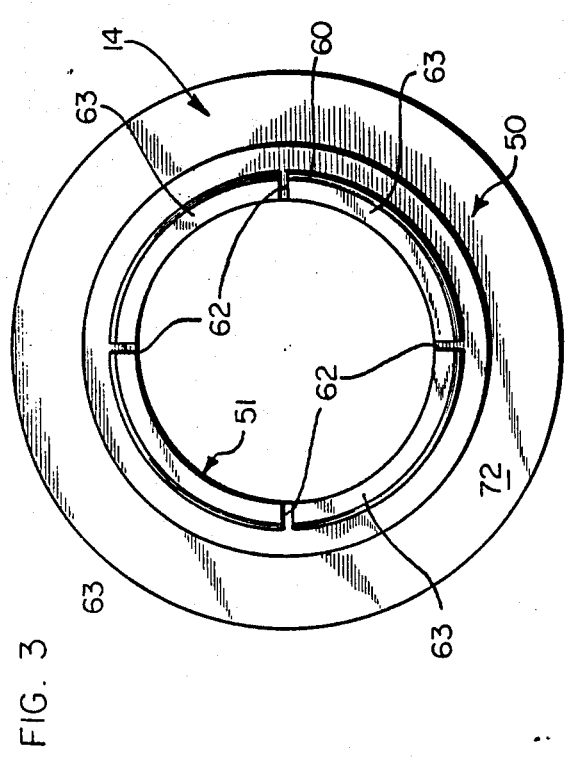
FIG. 3 is an end plan view of the carrier sleeve portion of the embodiment of FIG. 1, illustrating further details thereof.

Referring now initially to FIGS. 1-3, a novel self-aligning clutch release bearing and carrier sleeve assembly is designated by the reference numeral 10. This assembly 10 generally comprises a clutch release bearing 12 and a carrier sleeve member 14 which mounts the clutch bearing and also defines a first axis 15. That is, the clutch release bearing 12 is adapted to be installed upon the generally cylindrical carrier sleeve 14 in a position for engagement with a plurality of normally rotating clutch fingers 16, which are shown in phantom line in FIG. 1. These clutch fingers in turn rotate about a centerline or axis of rotation 25, which is intended to be substantially coincidental with the axis 15 of the carrier sleeve 14. However, due to a number of factors, such as slight misalingments between parts during manufacture and assembly, as well as misalignments which occur due to wear and operating forces while in service, these axes 15 and 25 are often not exactly coincidental. Hence, the axes 15 and 25 are shown in a somewhat exaggerated condition of misalignment in FIG. 1, to illustrate this phenomenon.

Advantageously, the present invention provides a novel self-aligning bearing and carrier sleeve assembly 10 including a mounting means or arrangement for mounting the bearing 12 to the carrier sleeve 14 in such a way as to permit a predetermined amount of radial movement of the bearing relative to the carrier sleeve. This amount of radial movement is provided so as to accommodate any misalignment which may occur between the axis 15 of the carrier sleeve and the axis 25 of the clutch finger 16. More particularly, the radial movement permitted bearing 12 relative to carrier sleeve 14 is such as to permit a more precise alignment or centering of an annular thrust face 18 of the bearing 12 relative to the clutch fingers 16.

At this point, it will be noted that one arrangement for achieving this mounting of the bearing relative to the carrier sleeve is illustrated in FIGS. 1–3. However, further arrangements for achieving this mounting are illustrated respectively in FIGS. 4–6; in FIGS. 7 and 8, and in FIGS. 9 and 10, respectively. In each of these embodiments, like reference numerals are used to designate like parts and components. However, like reference numerals together with respective subscripts a, b and c respectively will be utilized herein to designate various components and structures, which although differ in their structural details perform essentially the same functions among the additional three alternative forms just mentioned.

In this regard, each of the embodiments preferably utilizes a substantially identical bearing member or bearing assembly 12 which includes the previously mentioned thrust face 18 for engagement with the clutch finger 16 as shown in FIG. 1. Preferably, the thrust face 18 is an outwardly facing surface of a first generally annular, and preferably cup-like raceway element or member 20. In operation, it will be understood that the carrier sleeve 14 is carried on a shaft (not shown). Consequently, upon depression of a clutch pedal (not shown) the sleeve is moved axially along this shaft so as to force thrust bearing 12, and specifically thrust face 18 thereof, into engagement with the clutch fingers 16. A second generally annular raceway 22 is provided generally facing the raceway member 20 so as to receive a plurality of bearing elements 24 therebetween. In the illustrated embodiment the bearing elements 24 are spherical balls and hence inner surfaces of these tracks or raceways are generally semi-spherically shaped to accept these bearing elements 24. However, other configurations of bearing elements and cooperating raceway track configurations may be utilized without departing from the invention.

Also in the illustrated embodiment, the bearing 12 includes a combination carrier-spacer ring element 26 which is configured to maintain the ball bearing elements in an evenly spaced array about the circumferences of the raceways 20 and 22. Moreover, the illustrated bearing raceways 20 and 22 are shaped to engage the balls 24 from points somewhat beyond an axial centerline 28 thereof to and including a point somewhat beyond a radial centerline 30. It will be noted that reference herein to the axial and radial directions is with respect to the axis 15 of the carrier sleeve 14. This "over-center" contact of respective raceways 20, 22 with respect to the bearing elements 24 facilitates the ability of the bearing to withstand forces in a radial direction without separating the bearing components.

For example, when the bearing rotates at a high speed, centrifugal forces are created which tend to urge the ball bearing elements 24 radially outwardly, thus applying a force in a direction tending to separate the raceways 20 and 22. If such separation occurs, the areas of engagement between the ball bearings 24 and the raceways 20 and 22 will change, which may lead to excessive wear and early bearing failure. In the present design, the overlapping of the bearing raceway surfaces with respect to the axes 4 and 28 tends to overcome this tendency for the bearing elements or balls 24 to move radially outwardly and hence accommodates some degree of radial loading of the bearing.

A bearing shell or housing member 34 is generally L-shaped in cross-section and engages the first, front or radially outer raceway 20 at an outer circumferential surface thereof, generally radially outwardly of thrust face 18. The direction "front" and "rear" as used herein refer to the axial direction (along axis 15) with thrust face 18 defining the front of the assembly. The annular, L-cross-sectional shaped shell 34 extends rearwardly with respect to thrust face 18, to generally surround a rearwardly facing surface portion 36 of the second, rear or radially inner raceway member 22. However, it will be noted that the shell or housing 34 is spaced apart from this rear surface 36 so as to permit rotation of shell 34 in unison with raceway 20 while, as will presently be described, the inner or second raceway 22 remains stationary or non-rotatable relative to the carrier sleeve 14. An additional generally flat, annular inner seal member 38 may also be provided bridging respective inwardly facing surfaces of the raceways 20 and 22, to provide a seal against radially inward leakage or loss of lubricants or the like. In order to receive and position the seal 38, the outer raceway 20 is additionally provided with a radially inner shoulder portion 40.

A radially outer shoulder portion 42 is provided on the bearing 20 for engagement with a complementary formed, bent-over forward portion or lip 44 of the shell or housing 34. In accordance with the invention there is provided a novel mounting means or arrangement, designated generally by reference numeral 50, for permitting some radial motion of the bearing 12 relative to carrier sleeve 14 to accommodate slight misalignments between the respective axes 15 and 25 as discussed above. In the embodiment illutrated in FIGS. 1 through 3, this mounting means or arrangement 50 includes a radially inwardly extending shoulder portion 52 formed on the second or inner raceway member 22, and a recess or recess means 54 of generally complementary dimensions for receiving the shoulder portion 52 therewithin formed in the carrier sleeve 14. In accordance with the invention, the raceway shoulder portion 52 terminates at a position 56 which is radially spaced apart from a radially innermost end or surface 58 of the recess means 54 for permitting a predetermined amount of radial movement of the bearing relative to the carrier sleeve. However, it will be noted that the recess 54 generally prevents axial movement of the bearing relative to the carrier sleeve.

In the embodiment of FIG. 1, the mounting means 50, including recess means 54 is formed as a mounting portion 51, integral with the carrier sleeve 14. The recess means 54 is sized for frictionally engaging the shoulder portion 52 so as to permit a predetermined amount of radial movement thereof only in response to an externally applied force sufficient to overcome frictional forces of engagement between recess 54 and shoulder 52. Hence, the engagement therebetween is such as to hold the bearing in its last-achieved radial position in the absence of, or upon cessation of, forces or force components applied thereto in the radial direction. That is, once alignment of the thrust face 18 with clutch fingers 16 is achieved, the frictional engagement between recess 54 and shoulder 52 tends to maintain the bearing 12 in the position at which such alignment is achieved. Thereafter, should further radial misalignments occur during operation, the radial forces apply to the bearing structure 12 as a result of such misalignments will normally be sufficient to overcome this frictional force of engagement and cause sufficient radial movement of the bearing to realign the thrust face 18 with the clutch fingers 16. In this regard, the carrier sleeve 14 of the embodiment of FIGS. 1–3 is formed of a plastics material, with the mounting means 50 formed integrally therewith and including an elastically deformable, generally annular mounting portion 51 for snapping engagement of the bearing raceway 22 therewith to facilitate assembly thereof.

More particularly, in this regard, the mounting portion 51 of the carrier sleeve defines a generally annular undercut notch 54 comprising the recess means for receiving and frictionally engaging the shoulder 52. It will be seen that this undercut notch has one axial wall or surface, here indicated by reference numeral 55, which is canted or tilted somewhat axially rearwardly with respect to thrust face 18. The mounting portion 51 further includes a cam lead-in surface or ramp 60 which is axially spaced by axial distance 61 from the notch or recess means 54 to initially engage and guide the bearing, and particularly the raceway portion 22 and shoulder 52 up over ramp 60 and into engagement with recess or notch 54.

To this end, and as best viewed in FIG. 3, the elastically deformable, generally annular mounting portion 51 is also preferably through-slotted at a plurality of locations about the periphery thereof. That is, a plurality of radial through slots 62 are provided, which in the illustrated embodiment are shown generally at respective quadrants or 90-degree intervals about the circumference of mounting portion 51. These slots define elastically deformable means or segments 63 which permit some elastic or resilient inward bending of the mounting portion 51 thereby defining elastically thereof to permit the bearing, and particularly raceway 22 and shoulder 52, to ride up over the lead-in or ramp surface 60 and into engagement with recess means or notch 54. That is, the radially through openings 62 are circumferentially spaced for permitting elastic radially inward deformation of mounting portion 51 of the mounting means 50 to receive the bearing 10 thereover for axial movement over the cam lead-in surface 60 and thereafter, for resilient return of mounting portion 51 to an undeformed state so as to engage the notch or recess thereof about the raceway shoulder portion 52.

Figure 4:
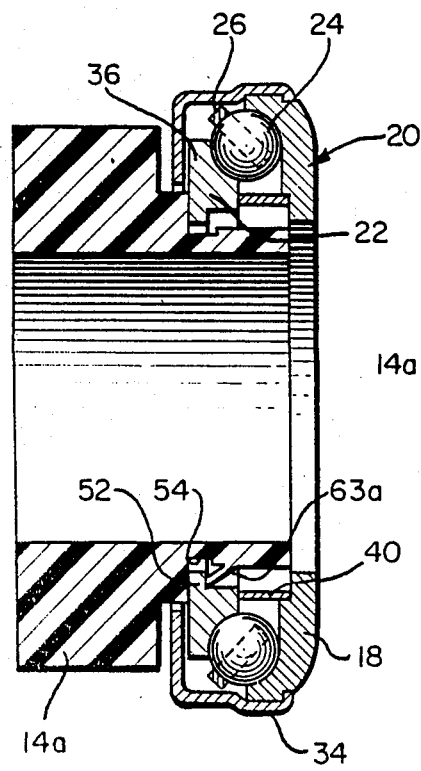
FIG. 4 is a sectional view taken diammetrically across a clutch release bearing and carrier sleeve assembly similar to that of FIGS. 1 and 2, but constructed in accordance with a second embodiment of the invention.
Figure 5:
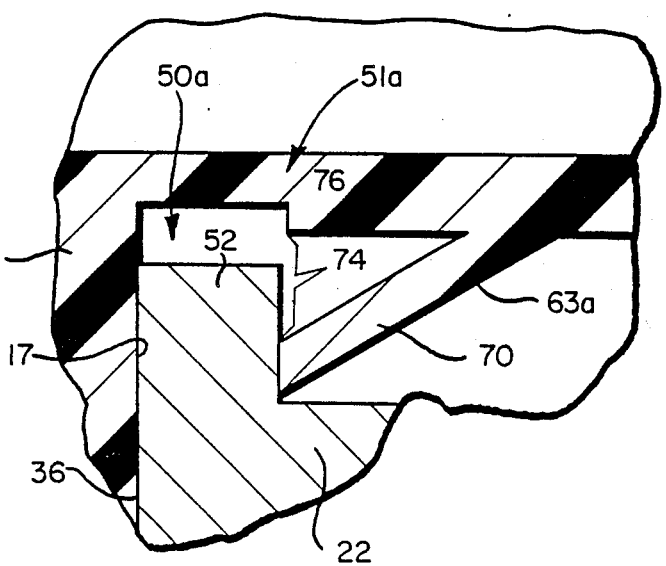
Figure 6:
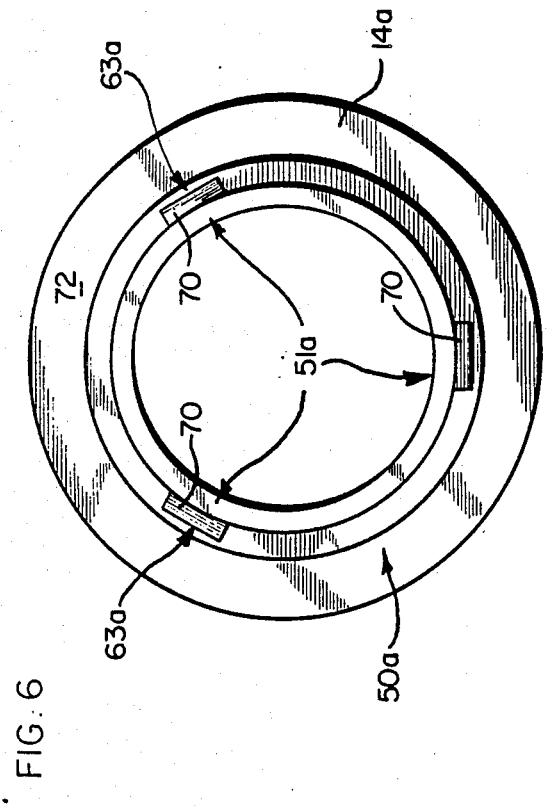
FIG. 6 is an end view, similar to the view in FIG. 3, of the carrier sleeve portion of the assembly of FIGS. 4 and 5 illustrating further details thereof.

Referring now to FIGS. 4 through 6, a second embodiment of a mounting means or arrangement is designated by reference numeral 50a. As with the carrier sleeve 14 of FIGS. 1–3, a similar carrier sleeve 14a has the mounting means formed integrally as a mounting portion 51a. In this regard, carrier sleeve 14a and the mounting portion 51a thereof are formed of a plastics material. The mounting portion 51a includes resilient or elastically deformable means, here designated by reference numeral 63a for snappingly engaging the bearing raceway 22 and specifically shoulder portion 52 thereof. In the embodiment illustrated in FIGS. 4–6, this elastically deformable means comprises a plurality of circumferentially spaced, elastically deformable protruding members or fingers 70 (see also FIG. 6). These members 70 are elastically retractable radially inwardly for receiving the bearing 12 and specifically raceway 22 and shoulder 52 thereof thereover, and are resiliently returnable for thereafter frictionally engaging the raceway 22 and particularly shoulder 52 thereof. These protruding members or fingers 70 further partially define the recess means 54a for receiving and engaging this shoulder 52 of raceway 22.

More particularly, and with reference now to the embodiments of both FIGS. 1–3 and FIGS. 4–6, both carrier sleeves 14 and 14a include at the mounting portions 51, 51a thereof increased diameter abutment portion 72 for abutting a rearwardly facing surface 36 of the raceway 22 and of shoulder portion 52 relative to the thrust face 18. In the embodiment of FIGS. 1 through 3, this increased diameter abutment surface 72 is generally radially extending and axially spaced from the undercut surface 55 for engaging the shoulder 52 therebetween. In the embodiment of FIGS. 4 through 6, the surface 72 opposingly faces the outermost ends of the elastically deformable protruding members 70, it will be noted, which compare elastically deformable rearwardly diverging fingers or finger-like members.

That is, these protruding members or fingers 70 generally diverge rearwardly or in the direction of the radially extending abutment surface or portion 72 for engaging the raceway shoulder portion 52 therebetween. It will be noted that as these fingers diverge, they leave, in part, a generally open space 74 sufficient to receive the fingers 70 in retracted or axially inwardly collapsed condition to permit passage of the shoulder 52 thereover to permit assembly of the bearing with the carrier sleeve, and particularly assembly of protruding shoulder portion 52 with recess 54. In this regard, as best viewed in FIG. 5, a radially inner portion of recess means 54 is defined by a radially inwardly extending annular portion of the mounting portion 51a forming a slight annular shoulder therein as indicated generally by reference numeral 76. This shoulder 76 defines the space 74, which as mentioned leaves sufficient space for collapse of fingers 70 to permit passage of shoulder 52 thereover, immediately prior to resilient return thereof to the receiving or bearing-shoulder engaging position shown in FIGS. 4 and 5. Hence, the rearwardly diverging fingers 70 are inwardly elastically deformable for receiving the raceway shoulder portion thereover and thereafter are resiliently returnable for engagement with the raceway shoulder portion.

In the embodiments of FIGS. 7 and 8, and FIGS. 9 and 10, respectively, the mounting means 50b and 50c comprise generally annular mounting members 80 and 82, 84 respectively. Each of these annular mounting members has an inner surface 86, 88, 90, respectively adapted for non-rotatable engagement with the carrier sleeve. Turning first to the embodiment of FIGS. 7 and 8, the generally annular mounting member 80 also defines on its radially outer surface the recess means 54b for engagement with the shoulder portion 52 of the raceway 22.

The annular mounting members 82, 84 in the embodiment of FIGS. 9 and 10 further are provided with positioning means for cooperating with corresponding positioning means on the carrier sleeve 14c for positioning the respective annular members 82, 84 in a spaced apart condition on the sleeve 14c. This positioning thereby defines between the two annular members 82 and 84 the recess means 54c for receiving the raceway shoulder portion 52.

Figure 7:
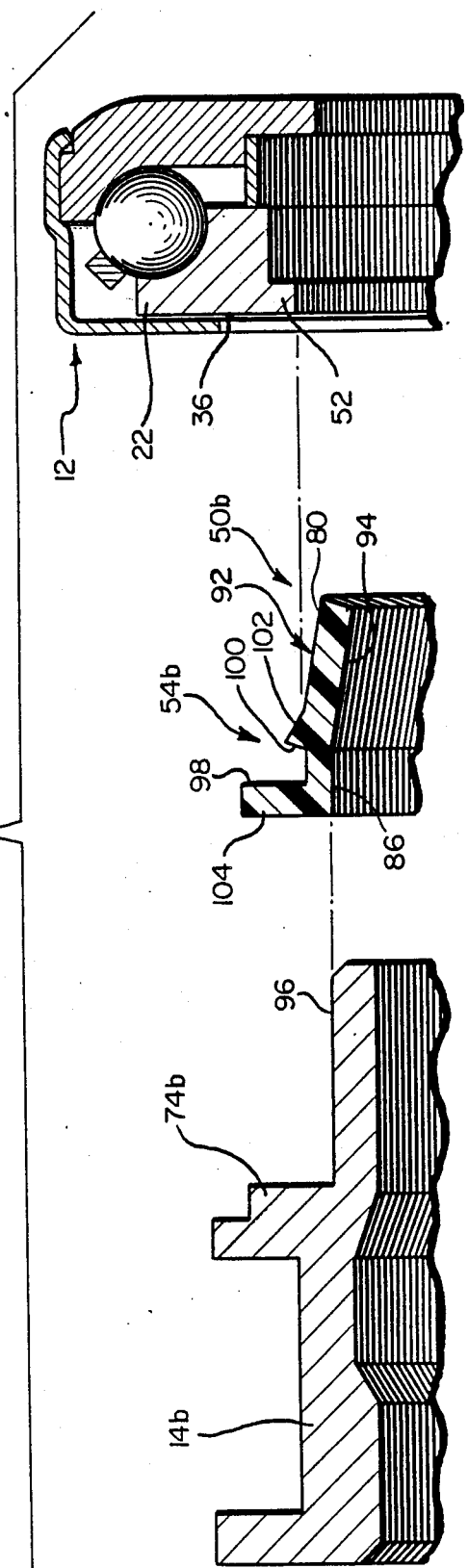
FIG. 7 is an exploded, partial sectional view of a bearing and carrier sleeve assembly is accordance with a third embodiment of the present invention.

Returning now to the embodiment of FIGS. 7 and 8, as best viewed in FIG. 7, the annular mounting member 80 includes a first generally frustro-conical elastically deformable portion 92. This portion 92 defines a generally frustro-conical inner surface 94 of lesser minimum diameter than the outer diameter of the carrier sleeve 14b at a generally cylindrical outer surface portion 96 thereof to which the mounting member 80 is to be engaged about. This frustro-conical portion 94 is elastically radially outwardly deformable for engagement over portion 96 of the carrier sleeve 14b. As previously mentioned, the outer surface of mounting member 80 defines the recess means 54b.

More particularly, first and second generally radially raised or radially extending abutment portions or surfaces 98, 100 protrude radially from the outer surface of member 80 to define the recess means 54b therebetween. Moreover, the abutment portion or surface 100 is defined at a rear edge, with respect to the thrust face 18, of a cam lead-in or ramp surface 102. This ramp surface 102 is thus axially spaced from the recess means 54b in the direction of the thrust face for thereby guiding the bearing 12, and more particularly the raceway shoulder portion 52 thereover and into engagement with the recess 54b.

In this regard, the cam lead-in or ramp surface 102 diverges in an axially rearward direction from the frustro-conical portion 92 and is elastically radially inwardly deformable therewith to permit the shoulder portion 52 of raceway 22 to ride thereover and into initial engagement with the recess means 54b. Thereafter, upon engagement of inner surface 94 of mounting member 80 with outer surface 96 of carrier sleeve 14b, the frustro-conical portion 92 and cam lead-in portion or ramp 102 will be deformed in a generally radially outward direction so as to extend surface 100 into a generally radial orientation generally parallel with and spaced from abutment surface 98 so as to grippingly engage the raceway shoulder portion 52 therebetween. In this regard, radially extending abutment surface 74b of the carrier sleeve 14b acts as a stop or positioning means or surface for defining the fully assembled condition of mounting member 80 therewith. That is, a rearwardly facing surface 104 of abutment portion 98 will abut this upstanding abutment or positioning surface 74b of the carrier sleeve 14b.

It is envisioned in the embodiment of FIGS. 7 and 8 that assembly of the bearing and carrier sleeve will proceed by initially assembling the bearing 12 over the mounting member 80, such that the ramp surface 102 may deform inwardly somewhat to receive the shoulder 52 thereover. Upon full advancement of the face or surface 36 of raceway 22 relative to abutment surface 98, the now assembled mounting member 80 and bearing 12 may be further assembled with the carrier sleeve 14b. Thereupon, the outward flexing or resilient deformation of the frustro-conical portion 92 and cam or ramp surface 102 carried thereupon will cause gripping frictional engagement of the shoulder 52 between respective surfaces 98 and 100 of the mounting member 80.

Referring now more particularly to the embodiment of FIGS. 9 and 10, it will be noted that the carrier sleeve 14c has a generally annular or cylindrical outer surface portion 96c, similar to surface portion 96 of FIG. 7, and of an outer diameter complementary for receiving the first and second mounting members 82 and 84 closely engaged thereover. These mounting members are thereby non-rotatably engaged with the carrier sleeve 14c. Moreover, an increased diameter or radially outwardly extending portion 74c defines an abutment surface for defining full advancement of the first mounting member 50c with respect to portion 96c of the carrier sleeve. In this regard, the first mounting member 82 comprises a generally annular, grommet-like member of an elastomeric material, such as rubber or a synthetic rubber-like material, disposed against the abutment surface 74c to be engaged between the abutment surface 74c and the facing surface 36 of the bearing raceway 22. This arrangement permits a frictional engagement of the shoulder portion 52 of the raceway while permitting some radial movement thereof relative to the carrier sleeve 14c.

The second generally annular mounting member 84 is preferably formed of a plastics material and is generally cylindrical in form having an inner surface 90 of complementary dimension for non-rotatable engagement with carrier sleeve portion 96c. The previously mentioned positioning means comprises locating notch means 110 on one of the carrier sleeve and second mounting member and a protruding locating tab member or means 112 on the other of the carrier sleeve and annular mounting member 84. In the illustrated embodiment, the locating notch means 110 comprises a generally annular groove formed in a peripheral surface of carrier sleeve portion 96c, while the protruding tab is a complementary shaped, generally annular radially inwardly protruding ridge formed on the inner surface 90 of mounting member 84. It will be appreciated, however, that the locations of the notch and groove may be reversed, or that incomplete or circumferentially spaced notch and groove members or similar locating means may be provided without departing from the invention. In any event, the position of the locating means 110, 112 is such as to position the second annular mounting member 84 relative to the carrier sleeve axially spaced from the first annular mounting member 82 so as to define the recess means 54c therebetween. More particularly, this spacing is defined such that a rearwardly facing surface 114 of mounting member 84 is positioned for frictional engagement with the shoulder 52 so as to press the same slightly against elastomeric annular mounting member or ring 82 to achieve some frictional engagement or gripping of the shoulder 52 therebetween. As previously mentioned, this gripping engagement is such as to permit radial movement in response to radial forces applied for achieving alignment of thrust face 18 as desired, but precludes axial movement of the bearing. Moreover, the engagement is such as to substantially prevent radial movement of the bearing in the absence of, or upon cessation of radially acting forces or force components applied thereto.

While particular embodiments of the invention have been shown and described it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiments and specific contructions described herein but should be defined by the appended claims and equivalents thereof.

Accordingly, the aim in the appended claims is to cover all such changes and modifications as fall within the true spirit and scope of the invention.

The invention is claimed as follows:

1. A self-aligning clutch release bearing and carrier sleeve assembly including a carrier sleeve which defines a first axis and a bearing adapted to be brought into engagement with rotating clutch fingers or the like of a clutch mechanism, which clutch fingers rotate about a second axis which may not be exactly coincidental with said first axis, aid bearing and carrier sleeve assembly being adapted to adjust the rotational orientation of the bearing to coincide with the second axis of rotation of said clutch fingers, said bearing and carrier sleeve assembly comprising: a bearing including a generally annular thrust face for engagement with said clutch fingers and an annular radially inwardly extending shoulder portion; and mounting means for grippingly engaging said shoulder portion for mounting the bearing to said carrier sleeve; said mounting means defining recess means of complementary form for receiving said shoulder portion therewithin; said shoulder portion terminating at a position radially spaced apart from a radially innermost end of said recess means for permitting a predetermined amount of radial movement of said bearing relative to said carrier sleeve while substantially preventing axial movement of said bearing relative to said carrier sleeve; said mounting means comprising a generally annular mounting member having an inner surface adapted for non-rotatable engagement with said carrier sleeve and a radially outer surface defining said recess means for engagement with said shoulder portion of said bearing; and said annular mounting member including a first, generally frustoconical elastically deformable portion defining a frustoconical inner surface of lesser minimum diameter than the outer diameter of said carrier sleeve and elastically outwardly deformable for engagement thereover, and an outer surface defining a pair of axially spaced apart radially extending abutment surfaces defining said recess means therebetween, and a cam lead-in surface axially spaced from said recess means in the direction of said thrust face, said lead-in surface defining ramp means for guiding said shoulder portion thereover and into engagement with said recess means.

2. An assembly according to claim 1 wherein said recess means is sized for frictionally engaging said shoulder portion for permitting said radial movement thereof only in response to an applied force sufficient to overcome the frictional forces of engagement therebetween, and for holding said bearing in its last achieved radial position upon cessation of said applied force.

3. An assembly according to claim 1 wherein said frustoconical portion facilitates initial engagement of said bearing thereabout and wherein said cam lead-in surface diverges in an axial direction from said frustoconical portion and is elastically radially inwardly deformable therewith to permit said shoulder portion of said second raceway to ride thereover and into initial engagement with said recess means, and thereafter, upon engagement of said inner surface of said frustoconical portion with said outer surface of said carrier sleeve, for resiliently deforming said cam lead-in portion generally radially outwardly to form one of said abutment surfaces of said recess means for engagement with said shoulder portion.

4. An assembly according to claim 3 wherein one of said axially spaced radially extending abutment surfaces comprises an axial end surface of said diverging cam lead-in surface.

5. A self-aligning clutch release bearing and carrier sleeve assembly including a carrier sleeve which defines a first axis and a bearing adapted to be brought into engagement with rotating clutch fingers or the like of a clutch mechanism, which clutch fingers rotate about a second axis which may not be exactly coincidental with said first axis, said bearing and carrier sleeve assembly being adapted to adjust the rotational orientation of the bearing to coincide with the second axis of rotation of said clutch fingers, said bearing and carrier sleeve assembly comprising: a bearing including a generally annular thrust face for engagement with said clutch fingers and first and second annular raceways having a plurality of bearing elements disposed therebetween, one of said raceways rotating in unison with said thrust face and the other of said raceways being coupled with said carrier sleeve; and mounting means for grippingly engaging said second raceway for mounting the same to said carrier sleeve; said second raceway having an annular radially inwardly extending shoulder portion and said mounting means defining recess means of complementary form for receiving said shoulder portion therewithin; said shoulder portion terminating at a position radially spaced apart from a radially innermost end of said recess means for permitting a predetermined amount of radial movement of said bearing relative to said carrier sleeve while substantially preventing axial movement of said bearing relative to said carrier sleeve; said mounting means comprising a generally annular mounting member having an inner surface adapted for non-rotatable engagement with said carrier sleeve and a radially outer surface defining said recess means for engagement with said shoulder portion of said bearing; said annular mounting member including a first, generally frustoconical elastically deformable portion defining a frustoconical inner surface of lesser minimum diameter than the outer diameter of said carrier sleeve and elastically outwardly deformable for engagement thereover, and an outer surface defining a pair of axially spaced apart radially extending abutment surfaces defining said recess means therebetween, and a cam lead-in surface axially spaced from said recess means in the direction of said thrust face, said lead-in surface defining ramp means for guiding said raceway shoulder portion thereover and into engagement with said recess means.

6. An assembly according to claim 5, wherein said recess means sized for frictionally engaging said shoulder portion for permitting said radial movement thereof only in response to an applied force sufficient to overcome the frictional forces of engagement therebetween, and for holding said bearing in its last achieved radial position upon cessation of said applied force.

* * * * *

UNITED STATES PATENT AND TRADEMARK OFFICE
CERTIFICATE OF CORRECTION

PATENT NO. : 4,854,437
DATED : August 8, 1989
INVENTOR(S) : Richard F. Harrington It is certified that error appears in the above-identified patent and that said Letters Patent is hereby corrected as shown below:

Column 2, Line 36 "Fig. 4 is" to --Fig. 5 is--

Column 4, Line 14 " to the axes 4 and 28" to -- to the axes 24 and 28--

Column 9, Line 18 " axis, aid bearing" to -- axis, said bearing--

Signed and Sealed this

Fifteenth Day of October, 1991

Attest:

Attesting Officer

HARRY F. MANBECK, JR.

Commissioner of Patents and Trademarks